United States Patent
Tsutsumi et al.

(10) Patent No.: US 7,972,502 B2
(45) Date of Patent: Jul. 5, 2011

(54) AERATION-LESS WATER TREATMENT APPARATUS

(75) Inventors: Masahiko Tsutsumi, Fuchu (JP); Takumi Obara, Fuchu (JP); Nobuyuki Ashikaga, Kawasaki (JP); Katsuya Yamamoto, Yokohama (JP); Hiroshi Tamura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 95 days.

(21) Appl. No.: 12/166,383

(22) Filed: Jul. 2, 2008

(65) Prior Publication Data

US 2009/0032451 A1  Feb. 5, 2009

(30) Foreign Application Priority Data

Jul. 4, 2007 (JP) .................................. 2007-176571

(51) Int. Cl.
*C02F 3/30* (2006.01)
(52) U.S. Cl. ......... 210/150; 210/255; 210/605; 210/903
(58) Field of Classification Search .................. 210/150, 210/151, 255, 259, 605, 615, 617, 903
See application file for complete search history.

(56) References Cited

U.S. PATENT DOCUMENTS

| | | | | |
|---|---|---|---|---|
| 4,294,694 A | * | 10/1981 | Coulthard ...................... | 210/150 |
| 4,411,780 A | * | 10/1983 | Suzuki et al. .................. | 210/150 |
| 4,561,974 A | * | 12/1985 | Bernard et al. ................ | 210/151 |
| 4,717,519 A | * | 1/1988 | Sagami .......................... | 210/150 |
| 4,762,612 A | * | 8/1988 | Yoda et al. ..................... | 210/150 |
| 4,800,021 A | * | 1/1989 | Desbos .......................... | 210/150 |
| 4,895,645 A | * | 1/1990 | Zorich, Jr. ..................... | 210/150 |
| 4,915,841 A | * | 4/1990 | Lagana' et al. ................ | 210/615 |
| 4,919,815 A | | 4/1990 | Copa et al. | |
| 4,997,568 A | * | 3/1991 | Vandervelde et al. ......... | 210/150 |
| 5,049,266 A | * | 9/1991 | Gotz et al. ..................... | 210/151 |
| 5,399,266 A | * | 3/1995 | Hasegawa et al. ............. | 210/615 |
| 5,618,412 A | * | 4/1997 | Herding et al. ................ | 210/150 |

(Continued)

FOREIGN PATENT DOCUMENTS

JP  11-285696  10/1999

(Continued)

OTHER PUBLICATIONS

Advanced Treatment Facility Design Manual issued by Japan Sewage Works Association (May 25, 2994), copyright page, pp. 96, 97, 112, 113, 165, 166, 175, 176, 228, 229, 246, 247, 256, 257, and partial English-language translation thereof.

(Continued)

*Primary Examiner* — Christopher Upton
(74) *Attorney, Agent, or Firm* — Finnegan, Henderson, Farabow, Garrett & Dunner, L.L.P.

(57) ABSTRACT

An aeration-less water treatment apparatus including an anaerobic reactor which receives sewage to cause the sewage to flow as an upward stream, and an aerobic reactor which receives treated water from the anaerobic reactor to cause the water to flow as a downward stream so that the water contacts aerobic microorganisms and air to aerobically treat the polluted matter in the water, the apparatus further including a suspended sludge section located in a lower part of the anaerobic reactor and in which the anaerobic microorganisms are suspended in the sewage, and a carrier section located in an upper part of the anaerobic reactor and having carriers to which the anaerobic microorganisms are attached, the anaerobic microorganisms having flowed from the suspended sludge section being further attached to the carriers.

17 Claims, 11 Drawing Sheets

U.S. PATENT DOCUMENTS

| | | | | |
|---|---|---|---|---|
| 5,776,344 A | * | 7/1998 | McCarty et al. | 210/605 |
| 5,788,838 A | * | 8/1998 | Yamasaki et al. | 210/150 |
| 5,843,305 A | * | 12/1998 | Kim et al. | 210/151 |
| 6,565,750 B2 | * | 5/2003 | Nasr | 210/150 |
| 7,300,570 B2 | * | 11/2007 | Yang et al. | 210/151 |
| 7,390,400 B2 | * | 6/2008 | Geneys et al. | 210/150 |
| 2003/0111412 A1 | * | 6/2003 | Jeong et al. | 210/151 |

FOREIGN PATENT DOCUMENTS

| | | |
|---|---|---|
| RU | 2 013 382 | 5/1994 |
| RU | 2 045 483 | 10/1995 |
| RU | 2 050 336 | 12/1995 |
| RU | 2 170 710 | 7/2001 |
| RU | 2 238 247 | 10/2004 |
| RU | 2 253 629 | 6/2005 |
| SU | 1161481 | 6/1985 |
| WO | WO 91/03429 | 3/1991 |

OTHER PUBLICATIONS

Result of Substantive Examination mailed May 13, 2010, from the National Office of Intellectual Property of the Socialist Republic of Vietnam in counterpart Vietnamese Application Filing No. 1-2008-01652 and English translation thereof.

* cited by examiner

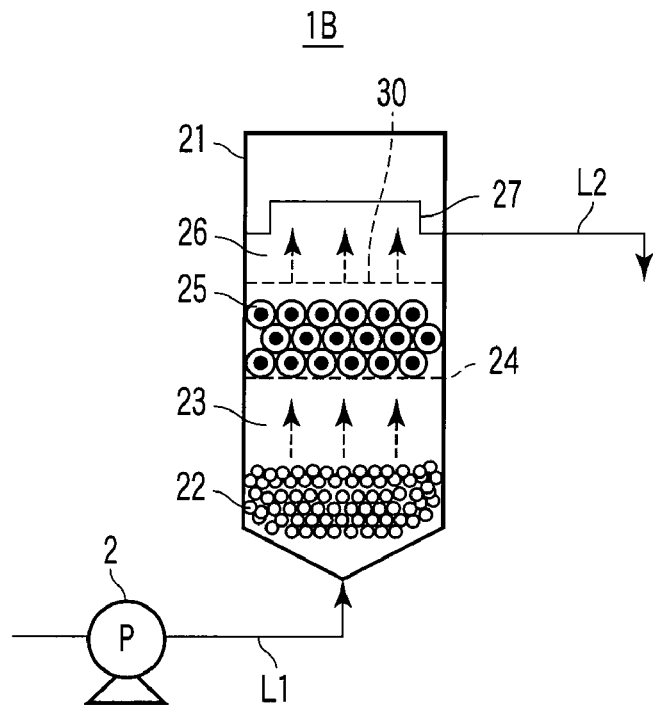
F I G. 11
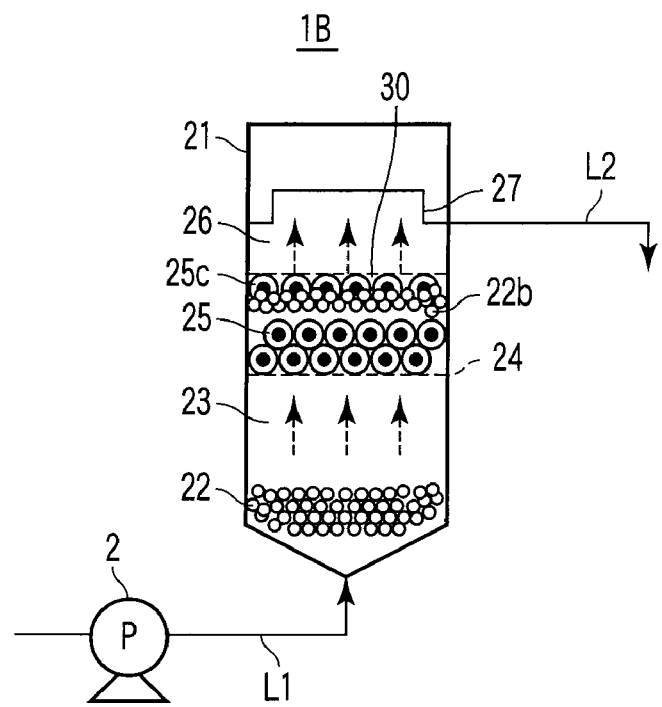
F I G. 12

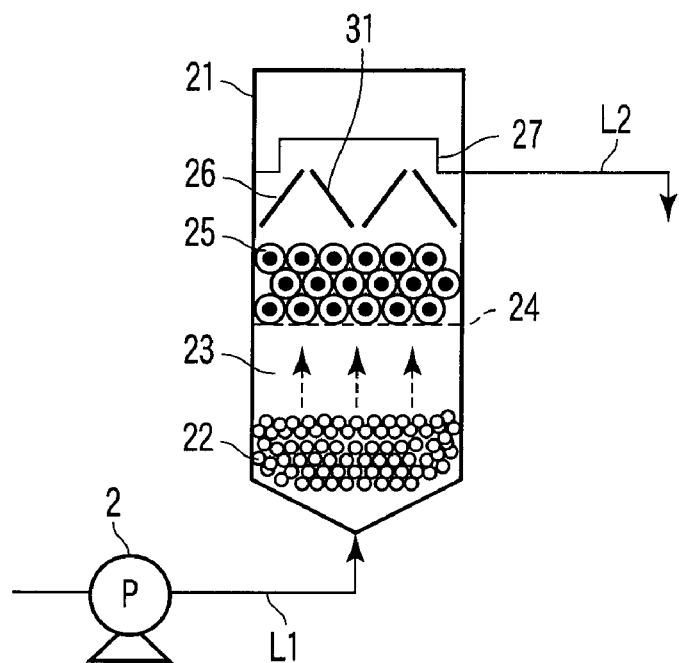
F I G. 13
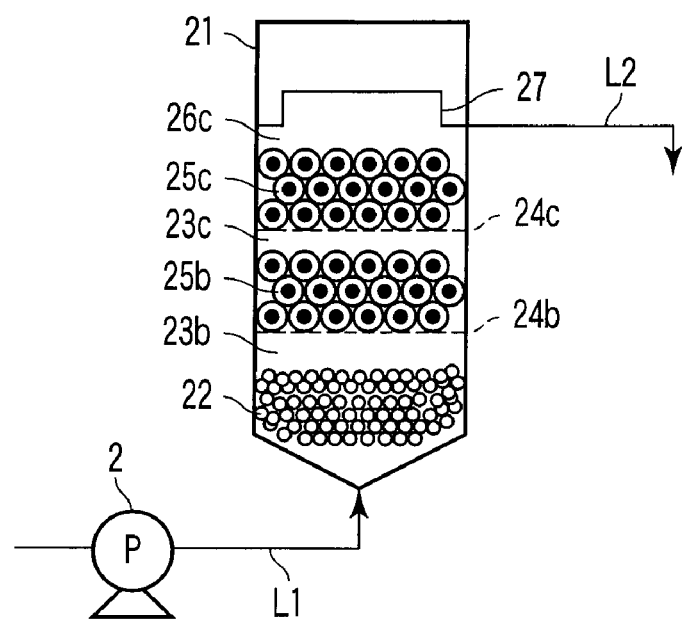
F I G. 14

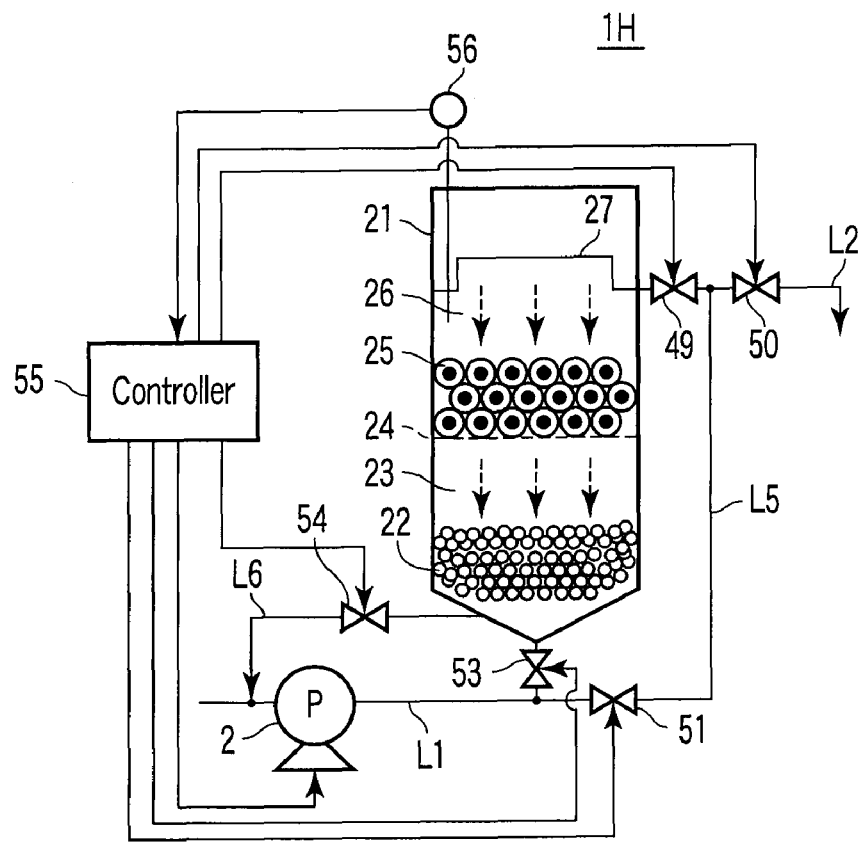
F I G. 19
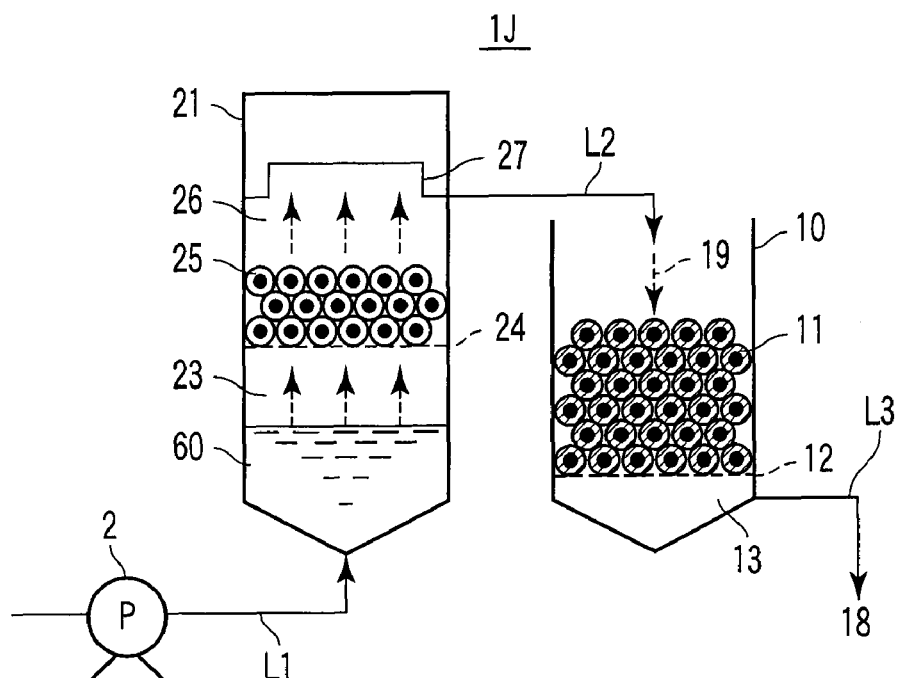
F I G. 20

AERATION-LESS WATER TREATMENT APPARATUS

CROSS-REFERENCE TO RELATED APPLICATIONS

This application is based upon and claims the benefit of priority from prior Japanese Patent Application No. 2007-176571, filed Jul. 4, 2007, the entire contents of which are incorporated herein by reference.

BACKGROUND OF THE INVENTION

1. Field of the Invention

The present invention relates to an aeration-less water treatment apparatus that performs a purifying treatment on waste water such as urban sewage, industrial liquid waste, and household liquid waste using microorganisms.

2. Description of the Related Art

JPA KOKAI Publication No. 11-285696 proposes an aeration-less water treatment apparatus utilizing anaerobic and aerobic microorganisms, as means for performing a purifying treatment on sewage. As shown in FIG. 1, in a conventional apparatus 100, sewage is drivingly introduced into an anaerobic reactor 104 through a line L1 by means of a pump 102. The anaerobic reactor 104 comprises an up flow anaerobic sludge blanket (hereinafter referred to as a "UASB") section 105 made up of a granular mass of anaerobic microorganisms and a supernatant section 106. Upon passing through the UASB section 105 in the form of an upward flow 107, waste water contacts anaerobic microorganisms in the UASB section 105. Then, organic polluted matter is removed from the sewage. The waste water from which the organic polluted matter has been removed by an anaerobic treatment passes sequentially through the supernatant section 106, an overflow section 108, and a line L2. The waste water is thus fed to the top of an aerobic reactor 110.

The aerobic reactor 110 comprises an aerobic microorganism adhering carrier section 111, a carrier support section 112, and a lower cavity section 113. A diffusion pipe 116 communicating with a blower 114 via an air line 115 is located in the lower cavity section 113. A treatment water reservoir 118 communicates with a side surface portion of the lower cavity section 113 via a line L3. When anaerobic treatment water fed into the aerobic reactor 110 contacts aerobic microorganisms in the aerobic microorganism adhering carrier section 111 while flowing as a down flow, the organic polluted matter remaining in the treatment water from the anaerobic reactor 104 is treated and discharged to the reservoir 118.

However, during a treatment operation performed by the conventional apparatus, various variations and disturbances described below may occur.
(1) Increase in the amount of inflow sewage
(2) Degraded quality of inflow sewage (increase in the amount of organic polluted matter)
(3) Mixture of a toxic substance or the like into the inflow sewage
(4) Increase in the amount of suspended solids in the inflow sewage
(5) Increase in the amount of gas generated
(6) Decrease in the concentration of the inflow sewage (from high-concentration biochemical oxygen demand (BOD) industrial liquid waste to low-concentration BOD sewage)

If any of the variations and disturbances (1) to (6) occurs, then in the conventional apparatus 100, anaerobic microorganisms (UASB) in the anaerobic reactor 104 flow out. This may result in problems (i) to (iii).
(i) Decrease in the concentration of microorganisms in the anaerobic reactor
(ii) Activation of the anaerobic microorganisms in the aerobic reactor
(iii) Degraded quality of treated water Normally, in the uppermost portion of the UASB section 105, a line velocity Lv associated with the amount of inflow sewage from a pump 102 is balanced with the fall velocity of UASB grains at a fixed height.

However, if (1) the increased amount of inflow of sewage increases the velocity of the upward flow 107 in the anaerobic reactor 104, the uppermost portion of the UASB section shifts upward to disadvantageously cause anaerobic microorganisms to flow out from the anaerobic reactor 104 to the aerobic reactor 110. Normally, the UASB does not flow out at a line velocity Lv of at most about 2 m/h. However, when the line velocity Lv exceeds 2 m/h, the UASB shifts (floats up) toward the top of the anaerobic reactor 104 and flow out from the anaerobic reactor 104 to the aerobic reactor 110.

If (2) the quality of the inflow sewage is degraded or (3) a toxic substance or an inhibitor mixes into the sewage, the limited load value for the UASB in the aerobic reactor 104 is exceeded. Consequently, the UASB may proliferate excessively or be dispersed and reduced and thus have a reduced specific gravity. The reduced specific gravity of the UASB makes the anaerobic microorganisms likely to flow out from the anaerobic reactor 104 to the downstream aerobic reactor 110 as in the case of disturbance (1), described above.

If (4) the amount of suspended solids in the inflow water increases, the shear force and agitating force of the suspended solids shear and crush the UASB, which is a mass (aggregate) of the anaerobic microorganisms. Thus, disadvantageously, the UASB may be dispersed and reduced.

(5) An increase in the anaerobic activity of the UASB causes the anaerobic microorganisms to generate a large amount of methane gas or $CO_2$ gas. The anaerobic microorganisms thus generate fermentation gas. The fermentation gas causes disturbance in the upward flow. The UASB is thus entrained in the fermentation gas and flow out toward the aerobic reactor 110 simultaneously with the upward flow.

(6) The UASB is originally utilized for industrial liquid waste treatment apparatuses containing high-concentration organic polluted matter with a biological oxygen demand (BOD) of several ten thousand to several hundred thousand mg/L. When the UASB is applied to a treatment apparatus containing low-concentration organism polluted matter with a BOD of 100 to 200 mg/L as in the case of sewage, the following problems may occur.

The anaerobic microorganisms constituting UASB are firmly aggregated into a mass by a sticky substance produced at a high-concentration BOD. However, when the anaerobic microorganisms are applied to sewage which has a low-concentration BOD, no sticky substance is produced, and the massive anaerobic microorganisms are dispersed and reduced. When dispersed and reduced, the UASB has a reduced specific gravity and thus floats up to the top of the anaerobic reactor 104 and then flows out from the anaerobic reactor 104.

When (i) the volume of the UASB section 105 in the anaerobic reactor 104 decreases, that is, the concentration of the anaerobic microorganisms decreases as described above, the throughput of the anaerobic reactor is reduced.

Furthermore, (ii) since the UASB is the mass of the anaerobic microorganisms, the UASB flowing out to the aerobic reactor 110, corresponding to the next step, reduces the concentration of dissolved oxygen (DO) in the aerobic reactor 110 to establish an anaerobic environment. Thus, the activity of the aerobic microorganisms in the aerobic reactor 110 is degraded. This reduces not only the treatment performance of the anaerobic reactor 104 but also the treatment performance of the aerobic reactor 110.

(iii) The degraded performance of the reactors 104 and 110 precludes the organic polluted matter in waste water from being sufficiently removed. Consequently, the quality of final treated water is disadvantageously degraded.

BRIEF SUMMARY OF THE INVENTION

The present invention has been made to solve the above-described problems. An object of the present invention is to provide an aeration-less water treatment apparatus which, when subjected to any of various variations and disturbances during a treatment operation, can inhibit anaerobic microorganisms from flowing out from an anaerobic reactor to stabilize the treatment performance of both the anaerobic reactor and an aerobic reactor, thus allowing treated water with stable quality to be discharged.

A standard activated sludge method, one of the conventional sewage treatment processes, the breakdown of energy consumed for water treatment is as shown below in (a) to (c).

(a) Sewage pump (a pump that feeds sewage to a reaction tank): 20 to 30%

(b) Return pump (a pump that returns sludge in a final settling tank to an aeration tank): about 10%

(c) Blower (an aeration apparatus that feeds air to the interior of the aeration tank): 50 to 60%

The above-described energy breakdown will be discussed. The use of (c) Blower, which consumes much energy, is disadvantageous in achieving a target energy consumption of 70%. Since the target energy saving cannot be achieved using (c), the blower in (c) is actually not used. On the other hand, the sewage pump in (a) is indispensable in order to supply sewage in a sewage pipe located deep under the ground to a ground water treatment apparatus. Thus, a system having only indispensable devices such as the sewage pump needs to be constructed without using the blower. Furthermore, a process technique for the system needs to be established. Thus, through earnest efforts to accomplish the above-described object, the inventors have successfully established a simplified water treatment system and a process technique described below.

The present invention provides an aeration-less water treatment apparatus comprising an anaerobic treatment tank which receives sewage fed by a pump through a bottom of the tank to cause the sewage to flow as an upward flow so that the sewage contacts anaerobic microorganisms to anaerobically treat polluted matter in the sewage, and an aerobic treatment tank which receives treated water from the anaerobic treatment tank at a top of the tank to cause the treated water to flow as a downward flow so that the treated water contacts aerobic microorganisms and atmospheric-pressure air to aerobically treat the polluted matter in the treated water, the apparatus being characterized by further comprising a suspended sludge section located in a lower part of the anaerobic treatment tank and in which the anaerobic microorganisms are suspended in the sewage, and a carrier section located in an upper part of the anaerobic treatment tank having carriers to which the anaerobic microorganisms are attached, the anaerobic microorganisms having flowed from the suspended sludge section being further attached to the carriers.

When fed to the bottom of the anaerobic treatment tank through the upward flow, the sewage is first primarily treated by contacting the anaerobic microorganisms suspended in the suspended sludge section. In the primary treatment, the anaerobic microorganisms relatively infrequently contact the organic polluted matter in the sewage. Thus, the primary treatment does not provide a high treatment efficiency but sufficiently functions as a pretreatment.

Then, the sewage in the upward stream contacts the anaerobic microorganisms in the carrier section as a fixed bed for a secondary treatment. In the secondary treatment, the anaerobic microorganisms very frequently contact the organic polluted matter in the sewage. The treatment efficiency is thus rapidly increased. At this time, the anaerobic microorganisms having flowed from the suspended sludge section into the carrier section through the upward stream is mostly sucked and caught by the carriers. The anaerobic microorganisms are thus mostly prevented from flowing out from the anaerobic treatment tank to the aerobic treatment tank. This improves the treatment efficiency in the anaerobic treatment tank and also increases the yield of the anaerobic microorganisms in the anaerobic treatment tank.

In the above-described apparatus, the apparatus preferably further has at least one of a mesh, a strainer, a baffle plate, and a filter device above the carrier section. The mesh or the like inhibits the possible outstream of the anaerobic microorganisms from the anaerobic treatment tank to the aerobic treatment tank. Consequently, the anaerobic microorganisms can proliferate in the anaerobic treatment tank. The anaerobic microorganisms are stably present in sewage with a high concentration (BOD: 1,000 to 10,000 mg/L) but is unstable in sewage with a low concentration (BOD: about 200 mg/L). Thus, an environment in which the anaerobic microorganisms proliferate easily is created in the anaerobic treatment tank by using the mesh or the like to restrict the outflow of the anaerobic microorganism. As a result, the anaerobic microorganisms in the anaerobic treatment tank maintain a high activity, thus preventing a possible decrease in treatment efficiency for a long period.

The carrier section can have a plurality of carrier groups arranged in series in a height direction of the anaerobic treatment tank. When two or three (or at least four) carrier groups are arranged in series in the carrier section, not only the treatment efficiency based on the anaerobic microorganisms is improved but also the anaerobic microorganisms can be more effectively prevented from flowing out.

In this case, first carriers with a large grain size can be located in a lower part of the carrier section. Second carriers having a smaller grain size than the first carriers can be located in an upper part of the carrier section. When the carrier groups with the different grain sizes are arranged in this manner, the waste water is first treated at a lower efficiency by the first carrier group and then at a higher efficiency by the second carrier group; the treatment efficiency increases step by step. Consequently, the activity of the anaerobic microorganisms is maintained for a long period without being degraded.

The first carriers of a material having a small surface area can be located in the lower part of the carrier section. The second carriers of a material having a larger surface area than the first carriers can be located in the upper part of the carrier section. When the carrier groups with the different surface areas are arranged in this manner, the sewage is first treated at a lower efficiency by the first carrier group and then at a higher efficiency by the second carrier group; the treatment efficiency increases step by step. Consequently, the activity of the anaerobic microorganisms is maintained for a long period without being degraded.

The carriers shaped like masses and having a high shape uniformity can be located in the lower part of the carrier section. The carriers shaped like strings (or rope or brush) and having a lower form uniformity than the mass-like (ball-like) carriers can be located in the upper part of the carrier section. When the carrier groups with the different shape uniformities are arranged in this manner, the sewage is first treated at a lower efficiency by the mass-like carrier group and then at a higher efficiency by the string-like carrier group; the treatment efficiency increases step by step. Consequently, the activity of the anaerobic microorganisms is maintained for a long period without being degraded. The mass-like carrier may be a cylinder, a sphere, a cubic, a rectangular parallelepiped, or any of various regular polyhedra. The string-like carrier may be, for example, a hung brush string including a stem string and a large number of brush bristles (or branch strings) 33d implanted on the periphery of the stem string 33c as shown in FIGS. 6A, 6B, 7A and 7B.

The apparatus can further have returning means for returning the anaerobic microorganisms from at least one of the carrier section, the upper part of the carrier section, and an outlet of the anaerobic treatment tank to the suspended sludge section. Although the carrier section catches and sucks the anaerobic microorganisms, the carrier section cannot catch all of the anaerobic microorganisms. Thus, the anaerobic microorganisms flowing through the carrier section and then toward the aerobic treatment tank are returned to the suspended sludge section. This allows further improvement of the yield of the anaerobic microorganisms in the anaerobic treatment tank.

The apparatus can further have flow reversing means for reversing a stream in the anaerobic microorganisms from the upward stream to the downward stream. The stream reversing means reverses the direction of the water stream in the anaerobic treatment tank to enable degradation of the anaerobic microorganisms attached to the carriers to be prevented. The activity of the anaerobic microorganisms can thus be maintained. The reversing of the water stream in the anaerobic treatment tank may be performed regularly or irregularly according to the results of monitoring of the condition of the interior of the treatment tank.

At least one of an up flow anaerobic sludge blanket (UASB), digestive sludge, and anaerobic microorganisms in anaerobic sludge for a biological nitrogen or phosphorous removal method can be present in the suspended sludge section of the anaerobic treatment tank. At least one of the UASB, digestive sludge, and anaerobic microorganisms in anaerobic sludge for the biological nitrogen or phosphorous removal method can also be present in the carrier section. Among these sludges, UASB exhibits the highest treatment performance but is expensive. The digestive sludge exhibits a medium treatment performance but is most inexpensive and readily available because the digestive sludge can be easily obtained in downstream concentrated sludge treatment steps. The anaerobic microorganisms for the biological nitrogen removal method or the like exhibits a medium treatment performance but is more expensive than the digestive sludge and not readily available. Thus, looking overall, the digestive sludge is most suitable for substances containing the anaerobic microorganisms.

BRIEF DESCRIPTION OF THE SEVERAL VIEWS OF THE DRAWING

FIG. 11 is a sectional block diagram schematically showing an aeration-less water treatment apparatus according to a third embodiment;

FIG. 12 is a sectional block diagram illustrating the operation of the apparatus according to the third embodiment shown in FIG. 11;

FIG. 13 is a sectional block diagram schematically showing an aeration-less water treatment apparatus according to a fourth embodiment;

FIG. 14 is a sectional block diagram schematically showing an aeration-less water treatment apparatus according to a fifth embodiment;

FIG. 19 is a sectional block diagram schematically showing an aeration-less water treatment apparatus according to a tenth embodiment;

FIG. 20 is a sectional block diagram schematically showing an aeration-less water treatment apparatus according to an eleventh embodiment;

DETAILED DESCRIPTION OF THE INVENTION

Various modes for carrying out the present invention will be described below with reference to the attached drawings.

First Embodiment

In the present embodiment, an aspect will be described in which an aeration-less water treatment apparatus according to the present invention is used for a sewage treatment facility.

Figure 1:
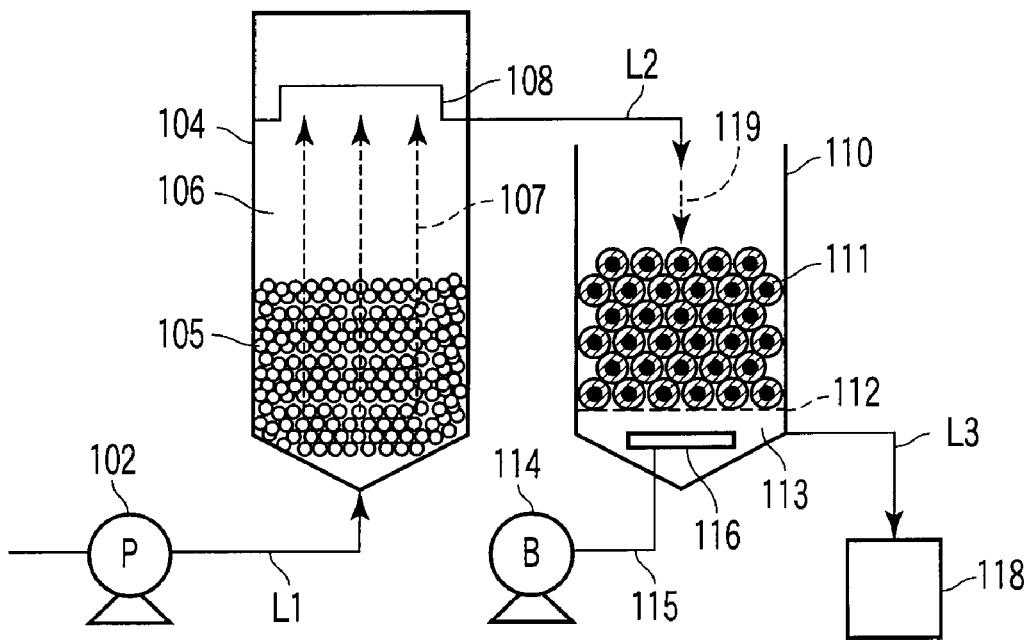
FIG. 1 is a sectional block diagram schematically showing a conventional apparatus.
Figure 2:
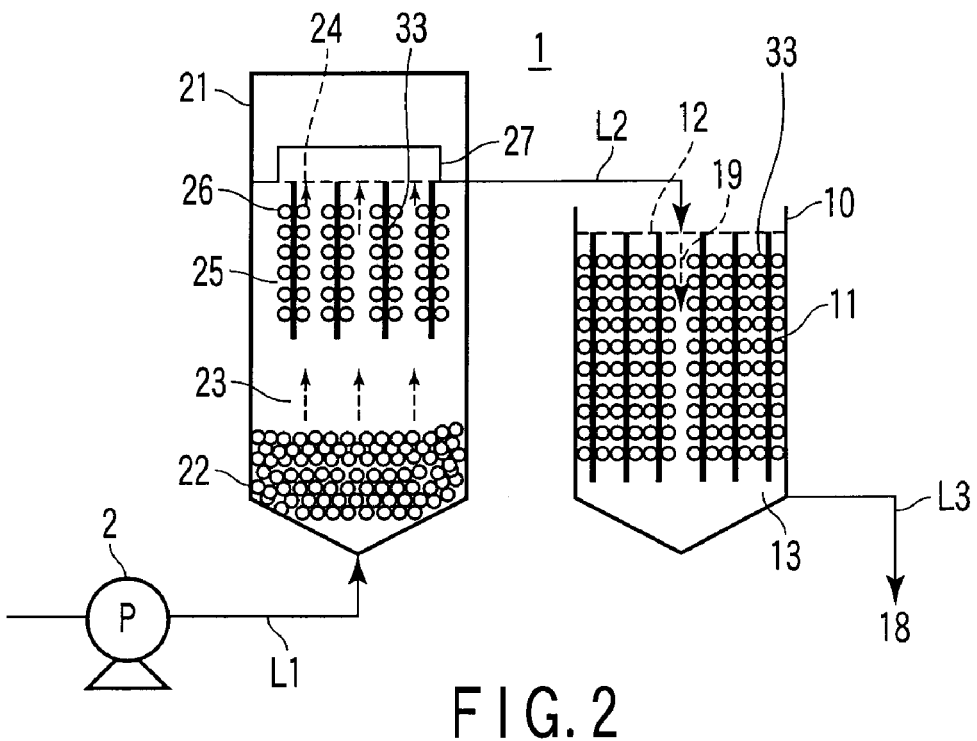
FIG. 2 is a sectional block diagram schematically showing an aeration-less water treatment apparatus according to a first embodiment.

As shown in FIG. 2, an aeration-less water treatment apparatus 1 comprises an anaerobic reactor 21 in a first stage and an aerobic reactor 10 in a second stage. An ejection port of a pump 2 is connected to the bottom of the anaerobic reactor 21 via a supply line L1. Waste water from a waste water source (not shown) is drivingly introduced into the anaerobic reactor 21 from below by means of the pump 2. The top of the anaerobic reactor 21 and the top of the aerobic reactor 10 are connected together by an overflow line L2. A cover is installed over an upper opening in the anaerobic reactor 21. A maintenance worker can open the cover to maintain and inspect the interior of the anaerobic reactor 21. An upper opening in the aerobic reactor 10 is open to the atmosphere.

The anaerobic reactor 21 comprises a suspended sludge section 22, a first supernatant section 23, a carrier support section 24, an anaerobic microorganism-adhering carrier section 25, a second supernatant section 26, and an overflow section 27 which are arranged in this order from below. A predetermined amount of UASB is fed into the suspended sludge section 22 and suspended at the bottom of the anaerobic reactor 21. The anaerobic microorganisms in UASB are attached and fixed to carriers in the anaerobic microorganism-adhering carrier section 25. The carriers are shaped like strings and supported by the carrier support section 24.

Figure 3:
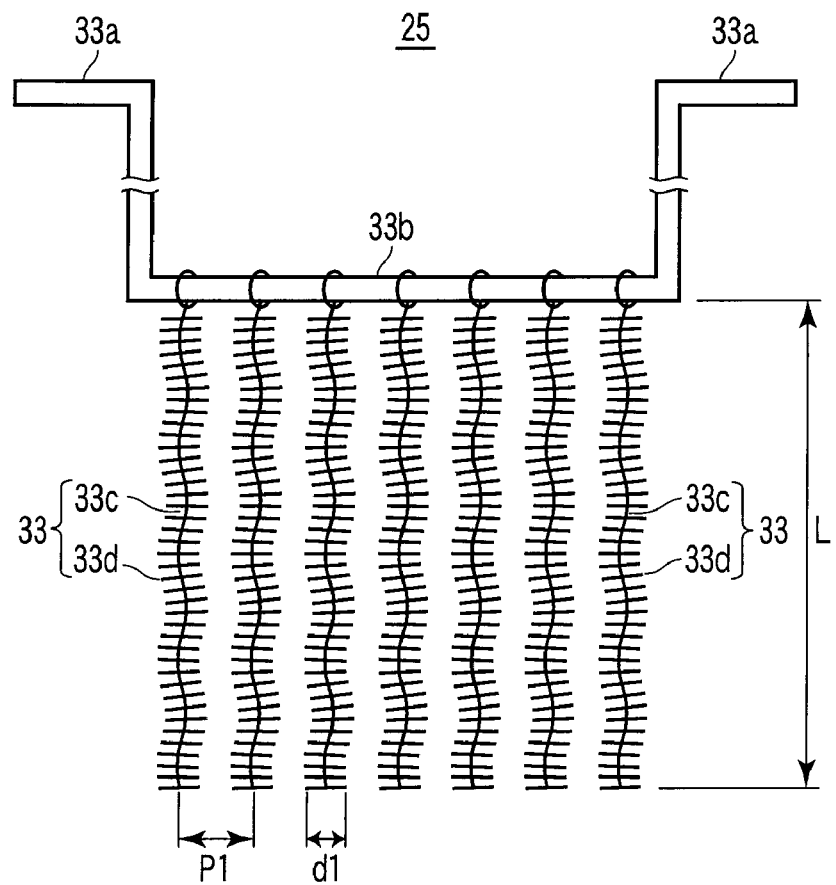
FIG. 3 is a side view schematically showing string-like carriers in an anaerobic microorganism-adhering carrier section in an anaerobic treatment tank.
Figure 4:
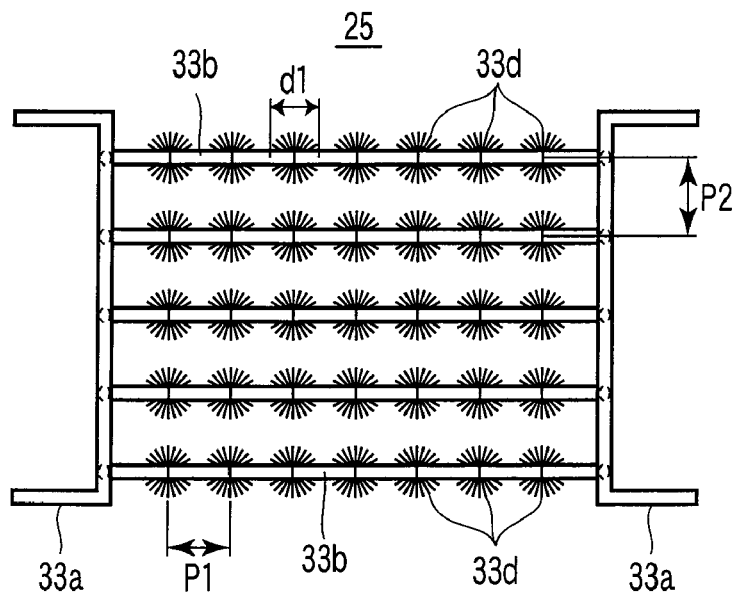
FIG. 4 is a plan view schematically showing the anaerobic microorganism-adhering carrier section in which the intervals among the string-like carriers are increased.
Figure 5:
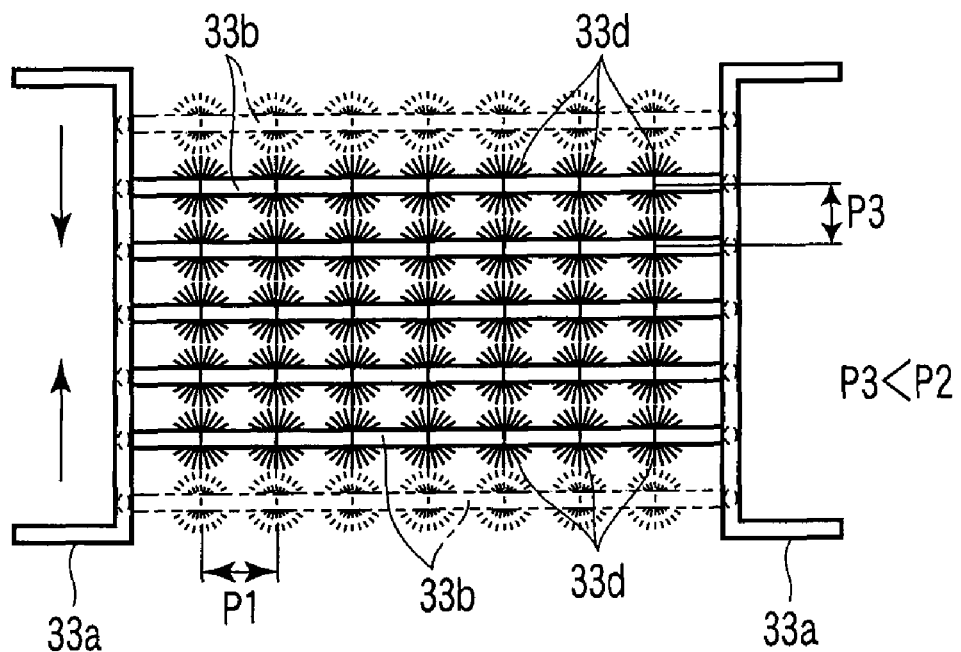
FIG. 5 is a plan view schematically showing the anaerobic microorganism-adhering carrier section in which the intervals among the string-like carriers are reduced.

Now, an example of a support hanging and supporting string-like carriers will be described with reference to FIGS. 3, 4, and 5.

Figures 6A, 6B:
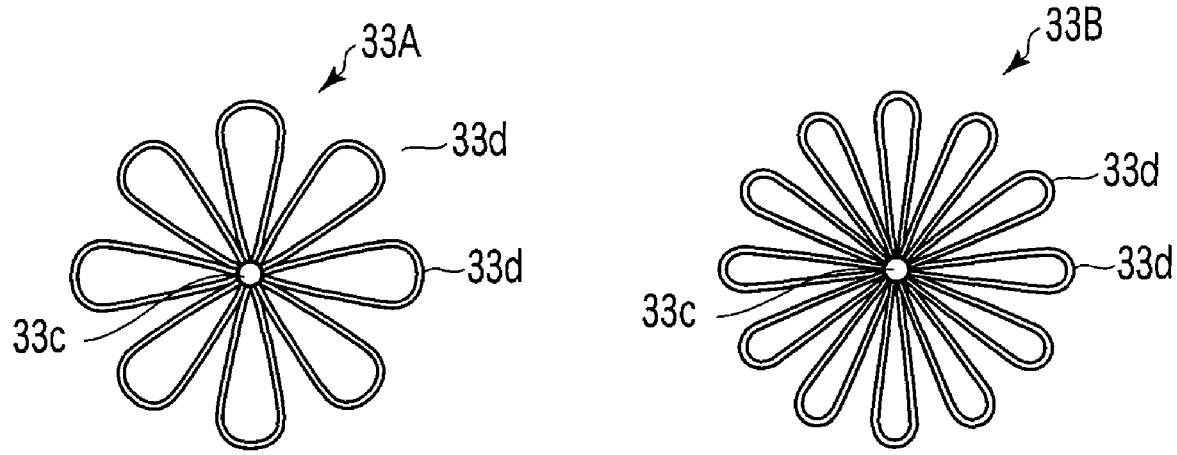
FIG. 6A is an enlarged plan view of the string-like carrier.
FIG. 6B is an enlarged plan view of a string-like carrier according to another embodiment.

The support comprises a lateral pair of arm sections 33a and a plurality of horizontal bars 33b to which the string-like carriers 33 are attached. Each of the arm sections 33a is L-shaped when viewed from the side as shown in FIG. 3, so as to be caught on an upper frame of the anaerobic reactor 21, or is U-shaped when viewed from above as shown in FIG. 4, in order to ensure safety. The horizontal bars 33b are solid or hollow bars provided horizontally between the lateral pair of arm sections 33a and parallel to one another and having a uniform diameter. Only the upper end of each of the string-like carriers 33 is bounded by the horizontal bars 33b, with the lower end of the carrier 33 free. As shown in FIGS. 6A and 6B, the string-like carrier 33 is shaped like an interproximal brush and includes a stem string 33c located in the center and having a large number of branch strings 33d annularly or spirally implanted on the periphery of the stem string 33c. The number of the branch strings 33d may be eight as in the case of a string-like carrier 33A shown in FIG. 6A or twelve as in the case of a string-like carrier 33B shown in FIG. 6B. The number of the branch strings 33d can be increased up to twenty. However, when the number of the branch strings 33d exceeds twenty, the contactability between the branch strings and water or anaerobic microorganisms is degraded to reduce treatment efficiency.

The plurality of string-like carriers 33 are tied to each of the plurality of horizontal bars 33b, supported by the lateral pair of support arms 33a. The plurality of string-like carriers 33 are hung and supported at the top of the anaerobic reactor 21. The string-like carriers 33 are attached to the horizontal bar 33b so that the distances P1 among the string-like carriers 33 correspond to almost equal pitch intervals. The distances P2 among the horizontal bars 33b also correspond to almost equal pitch intervals. The horizontal bars 33b are coupled to the lateral pair of support arms 33 so as to be slidably movable in a horizontal direction along the support arm 33a. Slidably moving the horizontal bars 33b enables the larger intervals P2, shown in FIG. 4, to be changed to smaller intervals P3 shown in FIG. 5. A manual rack and pinion mechanism or the like can be used as interval adjusting means for the horizontal bars 33b (string-like carriers 33).

The string-like carrier 33 can be made of flexible, elongate members such as filaments, twisted wires, flat bands, spiral bands, or zigzag pattern bands or combining at least two of these members. A material for the string-like carrier may be synthetic fibers, natural fibers, or mixed fibers formed by mixing synthetic fibers with natural fibers. In the present embodiment, synthetic fibers such as nylon are used as the material for the string-like carrier 33.

Since the string-like carrier 33 has a very large surface area and a complicated shape, the anaerobic microorganism-adhering carrier section 25 according to the present embodiment can efficiently capture anaerobic microorganisms having a small size and a low specific gravity. The anaerobic microorganisms can thus be effectively prevented from flowing out to the aerobic reactor.

Furthermore, the anaerobic microorganism-adhering carrier section 25 can be installed simply by hooking the lateral pair of support arms 33a on a frame of the anaerobic reactor 21. For replacement, the anaerobic microorganism-adhering carrier section 25 can be easily removed from the anaerobic reactor 21 simply by being raised. Thus, advantageously, maintenance work on the anaerobic microorganism-adhering carrier section 25 is very easy.

In the present embodiment, the filling factor of the anaerobic microorganism-adhering carrier section 25 is about 20% of an effective volume (the actual volume of water in the anaerobic reactor 21). The filling factor can be varied within the range of 10 to 50%. At a filling factor of less than 10%, the decomposing function of the anaerobic microorganism-adhering carrier section 25 as an anaerobic fixation bed fails to be sufficiently exhibited. On the other hand, at a filling factor of more than 50%, flow resistance increases to hinder the sewage from flowing smoothly through the anaerobic reactor 21 as an upward stream. Furthermore, an increased load is imposed on the sewage pump 2, which thus cannot last long. It is empirically known that an acceptable treatment condition can normally be established by setting the filling factor to be within the range of 20 to 30%.

The pump 2 is connected to the bottom of the anaerobic reactor 21 so that sewage is introduced into the bottom of the suspended sludge section 22 from a sewage source (not shown). The introduced sewage flows through the anaerobic reactor 21 as an upward stream in order of the suspended sludge section 22, the first supernatant section 23, the anaerobic microorganism-adhering carrier section 25, the second supernatant section 26, and the overflow section 27. The overflow section 27 of the anaerobic reactor 21 communicates with the top of the anaerobic reactor 10 via the overflow line L2.

The anaerobic reactor 10 comprises an aerobic microorganism-adhering carrier section 11, a carrier support section 12, and a lower cavity section 13. String-like carriers 33 similar to those described above are hung from and supported by the carrier support section 12. Water from which organic polluted matter has been removed by the suspended sludge section 22 and the carrier section 25 passes sequentially through the supernatant section 26, overflow section 27, and line L2 of the anaerobic reactor 21 and is fed to the top of the aerobic reactor 10. Then, while the water in a downward stream 19 contacts the aerobic microorganisms in aerobic microorganism-adhering carrier section 11 in the aerobic reactor 10, organic polluted matter remaining in the treatment water in the anaerobic reactor 21 is treated. The aerobic microorganisms are then discharged to a reservoir 18 through a discharge line L3.

Now, the operation of the aeration-less water treatment apparatus according to the present embodiment will be described.

(a) Water Treatment Operation in the Anaerobic Reactor

Sewage is fed to the bottom of the anaerobic reactor 2 vial the line L1 by driving the waste water pump 2. The sewage flows through the aerobic reactor 21 as an upward stream. The sewage is then fed to the suspended sludge section 22, in which anaerobic microorganisms in the anaerobic reactor 21 such as methane bacteria, acid fermenters, or sulfate reducers. UASB, which is an aggregate of anaerobic microorganisms, removes and decomposes the organic polluted matter in the sewage. Moreover, the anaerobic microorganisms attached to surfaces of the string-like carriers 33 very frequently contact the organic polluted matter in the sewage to rapidly increase the treatment efficiency. Chemical reaction in this case is as shown in Formulae (1), (2), and (3). That is, the acid fermentation bacteria decompose organic polluted matter such as polymer carbonhydrates into aliphatic acid such as palmitic acid, stearic acid, or oleic acid in accordance with Formula (1). The acid fermenters decompose the aliphatic acid into acetic acid in accordance with Formula (2). The methane fermenters decompose the aliphatic acid into methane and carbon dioxide in accordance with Formula (3).

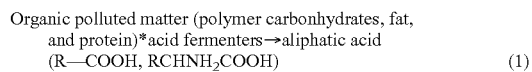

Organic polluted matter (polymer carbonhydrates, fat, and protein)*acid fermenters→aliphatic acid (R—COOH, RCHNH$_2$COOH)  (1)

Aliphatic acid*acetic acid (CH$_3$COOH)  (2)

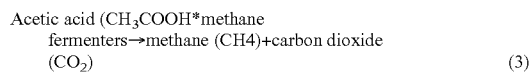

Acetic acid (CH$_3$COOH*methane fermenters→methane (CH4)+carbon dioxide (CO$_2$)  (3)

The treatment water from which the decomposed organic polluted matter has been removed flows through the first supernatant section 23 as an upward stream and then through apertures in the carrier support section 24. The treatment water then contacts the anaerobic microorganisms in the anaerobic microorganism-adhering carrier section 25. In the anaerobic microorganism-adhering carrier section 25, the remaining organic polluted matter having passed through the suspended sludge section 22 is further decomposed in accordance with Chemical Formulae (1), (2), and (3), shown above. The anaerobic microorganisms very efficiently thus contact the sewage among the string-like carriers 33. Consequently, the activity of the anaerobic microorganisms is maintained at a desired level for a long period without being degraded. The treatment water thus decomposed in two stages by the suspended sludge section 22 and the carrier section 25 is fed to the top of the aerobic reactor 10 through the second supernatant section 26, the overflow section 27, and the overflow line L2.

(b) Water Treatment Operation in the Aerobic Reactor

The treatment water flows through the aerobic reactor 10 in a downward stream. Waste water 19 in the downward stream is contacted with the aerobic microorganism-adhering carrier section 11 and air to decompose and remove organic polluted matter remaining instead of being decomposed by the anaerobic reactor 21 and hydrogen sulfide generated in the anaerobic reactor 21 in accordance with reactions expressed by Formulae (4) and (5).

Organic polluted matter+oxygen→carbon dioxide+ water

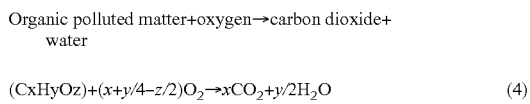

$(CxHyOz)+(x+y/4-z/2)O_2 \rightarrow xCO_2+y/2H_2O$  (4)

Hydrogen sulfide+oxygen→sulfuric acid+hydrogen ions

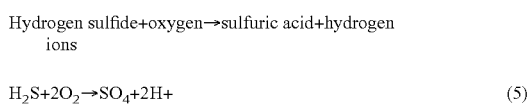

$H_2S+2O_2 \rightarrow SO_4+2H+$  (5)

(c) Operation of Inhibiting Possible Outstream (Overflow Loss) of the Anaerobic Microorganisms from the Anaerobic Reactor Besides the water treatment operation described above in (a), the anaerobic reactor 21 internally performs an operation of inhibiting possible outstream of UASB, which is an aggregate of anaerobic microorganisms in the suspended sludge section 2.

When a significant variation or disturbance occurs during a treatment operation, that is, if (1) the amount of inflow sewage increases, (2) the quality of the inflow waste water is degraded, or (3) a toxic substance or the like which may hinder the activity of the anaerobic microorganisms mixes into the sewage, then the aggregate of the anaerobic microorganisms present in the suspended sludge section 22 is dispersed and scattered or a fermentation gas such as methane adheres to the aggregate of the anaerobic microorganisms to reduce the specific gravity of the anaerobic microorganisms.

Figure 7A:
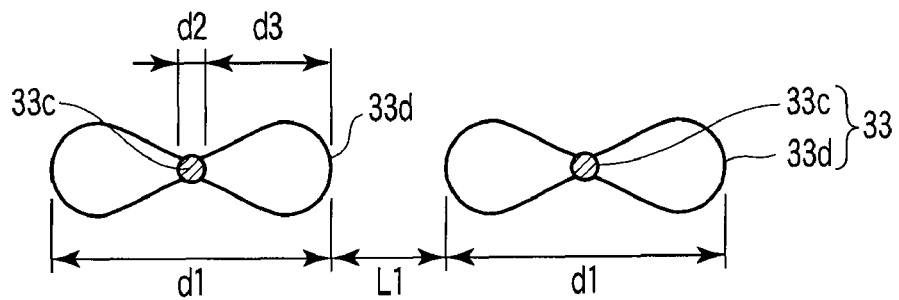
FIG. 7A is a schematic plan view showing a pair of spaced string-like carriers.
Figure 7B:
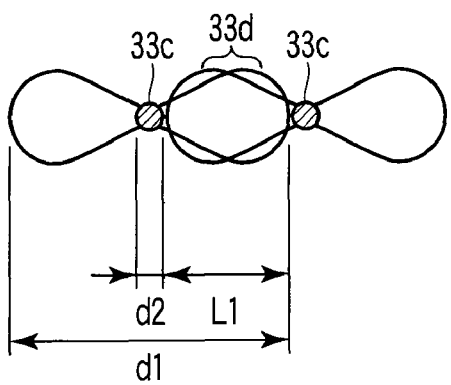
FIG. 7B is a schematic plan view showing a pair of string-like carriers arranged adjacent to each other so as to partly overlap.

The string-like carrier 33 includes a stem string 33c having a large number of loop bristles or brush bristles 33d implanted on the periphery of the stem string 33c. Aerobic microorganisms adhering to the surfaces of the string-like carriers 33 very frequently contact the anaerobic microorganisms in the waste water to rapidly increase the treatment efficiency. The string-like carrier 33 has a length L from an upper end (the position of the support 24) to a lower end (a position above the suspended sludge section 22) of a carrier filled section (FIG. 3). Furthermore, the string-like carriers 33 are hung and supported by the supports 24, 33a, and 33b so that the distances P1 among the string-like carriers 33 correspond to predetermined equal intervals. Preferably, the distance $L_1$ between the string-like carriers 33 is normally −1 to +4 times as large as the outer peripheral diameter $d_1$ of the string-like carrier 33. The adjacent string-like carriers 33 may be spaced from each other as shown in FIG. 7A or may partly overlap as shown in FIG. 7B. Here, the condition in which the adjacent string-like carriers overlap is expressed by a minus scale. When the distance $L_1$ between the string-like carriers 33 is smaller than the outer peripheral diameter $d_1$ multiplied by −1 times, the water fails to flow appropriately. On the other hand, when the distance $L_1$ between the string-like carriers 33 is greater than the outer peripheral diameter $d_1$ multiplied by +4 times, the water passes through upward without contacting the string-like carriers 33, thus reducing the treatment efficiency.

Figure 8:
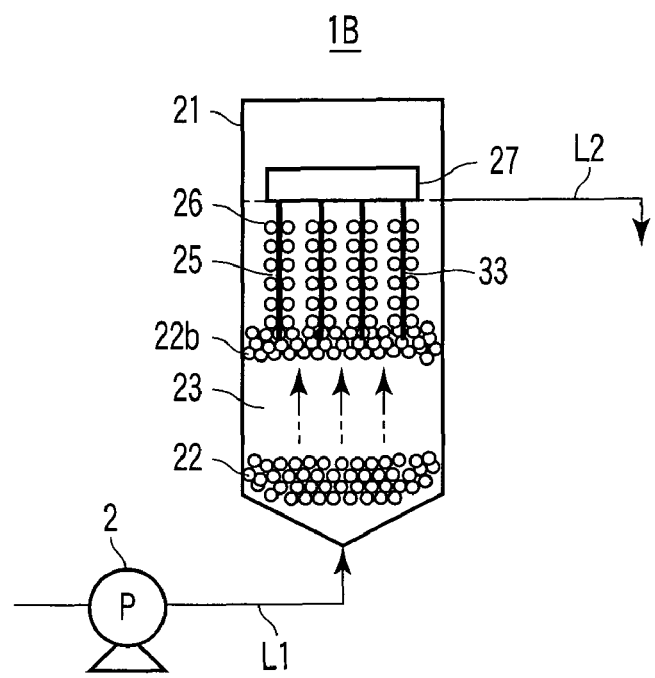
FIG. 8 is a sectional block diagram illustrating the operation of the apparatus according to the first embodiment shown in FIG. 2.

As shown in FIG. 8, at a reduced specific gravity, UASB, which is the aggregate of the anaerobic microorganisms in the suspended sludge section 22, floats up through the upward stream of the sewage and reaches the carrier section 25. The anaerobic microorganisms such as methane bacteria and acid fermenters and facultative anaerobic microorganisms (microorganisms that can grow both in an anaerobic environment and in an aerobic environment) adhere firmly to the carriers in the carrier section 25. The suspended UASB adheres to the surfaces of the anaerobic microorganisms or carriers in the carrier section 25 and settle in the carrier section 25 without reaching the second supernatant section 26. UASB thus forms a suspended sludge section anaerobic microorganism section 22b. Thus, the anaerobic microorganisms in the suspended sludge section 22, which have the reduced specific gravity, are captured in the carrier section 2. The anaerobic microorganisms are thus prevented from floating up to the overflow section 27, located above the carrier section 25, or flowing out to the aerobic reactor 10 through the overflow line L2.

The anaerobic microorganisms having the reduced specific gravity are likely to be captured in the anaerobic microorganism-adhering carrier section 25 because, first, the anaerobic microorganisms are of the same species and are hydrophilic, and second, the anaerobic microorganisms adhere firmly to the carriers in the carrier section 25. The anaerobic microorganisms in the suspended sludge section are thus fixed to the carrier section 25 in the anaerobic reactor 21 and prevented from flowing out to the aerobic reactor 10.

The effects of the present embodiment are discussed in (i) and (ii).

(i) Effect of Inhibiting a Decrease in the Concentration of the Anaerobic Microorganisms in the Anaerobic Reactor Even if a variation or disturbance occurs during a treatment operation, the anaerobic microorganisms in the suspended sludge section 22 can be inhibited from flowing out from the anaerobic reactor 21 to the aerobic reactor 10. Consequently, the concentration of the anaerobic microorganisms can be inhibited from decreasing (reducing loss of anaerobic microorganisms), thus stabilizing the water treatment operation in the anaerobic reactor 21.

(ii) Effect of Inhibiting Establishment of an Anaerobic Environment in the Aerobic Reactor and Degradation of an Aerobic Treatment The anaerobic microorganisms can be inhibited from flowing out from the anaerobic reactor 21 as described above and are thus prevented from flowing out to the interior of the aerobic reactor 10. Consequently, the introduction of anaerobic microorganisms into the aerobic reactor 10 (elimination of oxygen) is prevented. Prevention of establishment of the anaerobic environment in the aerobic reactor 10 allows the organic polluted matter and hydrogen sulfide to be efficiently removed in accordance with Formulae (4) and (5). Therefore, a decrease in the efficiency of the aerobic treatment can be inhibited.

In particular, the aerobic reactor 10 is based on a scheme of supplying atmospheric pressure air by means of natural fall without using a pressurized air source such as a blower or a compressor. Consequently, compared to the pressurized air source scheme, the present embodiment is likely to suffer the shortage of oxygen, shown above in Formulae (4) and (5). However, as described above, the apparatus 1 according to the present embodiment can inhibit the anaerobic microorganisms from flowing out to the aerobic reactor 10. The apparatus 1 can thus efficiently reduce the organic polluted matter and hydrogen sulfide without establishing the anaerobic environment in the aerobic reactor 10.

The present embodiment can exert another effect. That is, the large specific surface area of the string-like carrier 33 allows a large amount of anaerobic and aerobic microorganisms to be attached to the string-like carriers 33 to increase the microorganism concentration in the anaerobic reactor 21 and the aerobic reactor 10. Consequently, the treatment efficiency is effectively increased to improve the quality of treated water. Furthermore, the string-like carriers 33 can be easily installed simply by engageably locking the support arm 33a in the carrier support section 24. The present embodiment is thus also effective for facilitating operations of maintaining the carriers, such as cleaning, repairs, and replacement.

The effects of the distance between the carriers will be described with reference to FIGS. 7A and 7B.

The string-like carrier 33 is modeled as made up of the stem string 33c and the looped branch strings 33d. Then, when the interval adjusting means is not used, the adjacent string-like carriers 33 are spaced from each other. In this case, as shown in FIG. 7A, the distance from the outermost periphery of one of the branch string 33d to the outermost periphery of the other branch string 33d corresponds to the interval $L_1$ between the carriers. An increase in interval $L_1$ allows the sewage to flow more smoothly. Consequently, the sewage sufficiently contacts the anaerobic microorganisms to promote anaerobic treatment reaction. However, an excessive increase in interval $L_1$ increases the amount of sewage passing through (sewage not contacting the anaerobic microorganisms), reducing the treatment rate of the sewage. To effectively prevent the sewage from passing through, the interval $L_1$ is limited to at most the diameter d1 of the carrier multiplied by 4 ($L1 \leq 4 \times d1$) on the basis of the inventor's rule of thumb.

Thus, the interval adjusting means is used to place the adjacent string-like carriers 33 closer to each other and to further contact the adjacent string-like carriers 33 with each other to form a carrier crossing section. In such a carrier crossing section, as shown in FIG. 7B, the branch strings 33d of the adjacent carriers overlap to hinder the sewage from passing through, increasing the rate of the contact between the sewage and the anaerobic microorganisms. Thus, the treatment efficiency is drastically improved. However, when the adjacent carriers overlap excessively, the sewage has difficulty flowing smoothly, preventing a sufficient amount of waste water from being supplied to the anaerobic microorganisms. Thus, in the carrier crossing section, the overlapping length $L_1$ (minus interval) between the carriers is limited to the extending length d3 (=(d1−d2)/2) of the branch string section 33d to ensure a certain level of air permeability to inhibit a decrease in treatment efficiency.

As other embodiments of the present invention, various modifications and variations described below are possible. Components that overlap between the other embodiments, described below, and the first embodiment will not be described.

(1) Filling Factor of the Anaerobic Microorganism-Adhering Carrier Section 25

Second Embodiment

The anaerobic microorganism-adhering carrier section 25 according to the second embodiment, to which the anaerobic microorganisms in UASB are attached and fixed, are module fillers each made of plastics and having any of various shapes or forms including a cylinder, a sphere, an oval sphere, a cubic, a rectangular parallelepiped, a polyhedra, and a spiral. The carriers are supported by the carrier support section 24.

Figure 9:
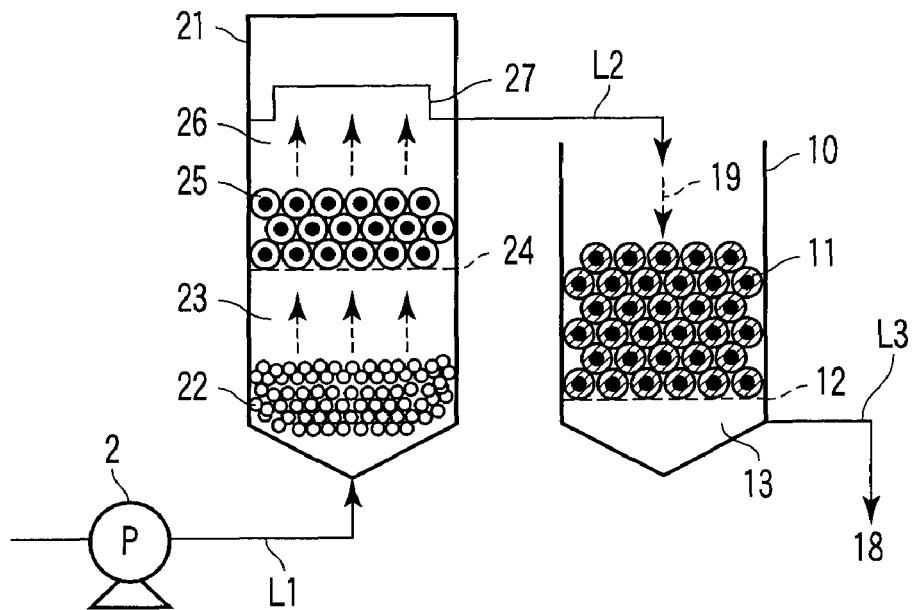
FIG. 9 is a sectional block diagram schematically showing an aeration-less water treatment apparatus according to a second embodiment.

In the apparatus 1 according to the first embodiment, the filling factor of the anaerobic microorganism-adhering carrier section 25 is about 20% of the effective volume (the actual volume of water in the anaerobic reactor 21). However, according to the present invention, the filling factor of the carrier section 25 is not limited to this aspect. In an apparatus 1A according to the present embodiment, as shown in FIG. 9, for example, the filling factor of the carrier section 25 is reduced to about 5 to 20% so that the water treatment operation is mainly based on the anaerobic microorganisms in the suspended sludge section 22. Thus, the carrier section 25 can be used mainly to inhibit possible outflow of the anaerobic microorganisms.

On the other hand, the filling factor of the carrier section 25 can be increased to 20 to 80% so that the water treatment operation is mainly based on the anaerobic microorganisms in the carrier section 25, corresponding to the fixation bed, instead of the anaerobic microorganisms in the suspended sludge section 22.

Figure 10:
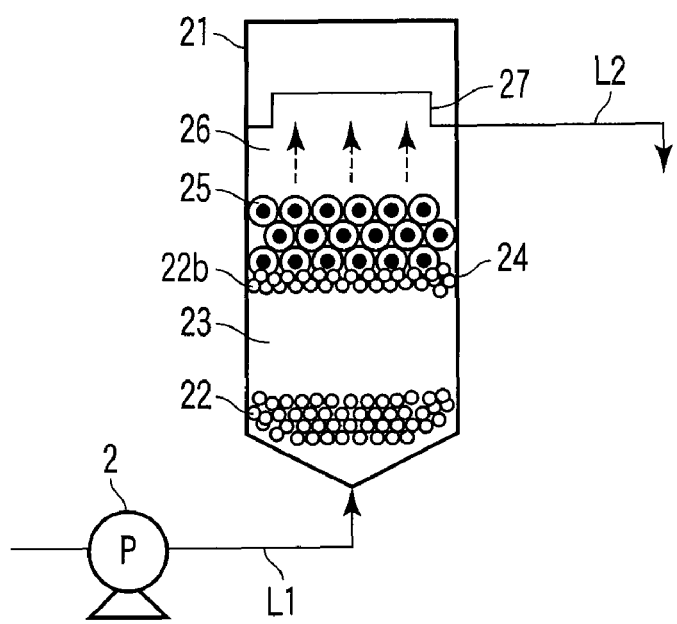
FIG. 10 is a sectional block diagram illustrating the operation of the apparatus according to the second embodiment shown in FIG. 9.

The increased filling factor of the carrier section 25 stops the anaerobic microorganisms in the suspended sludge section 22, at the carrier section 25 to prevent the anaerobic microorganisms from rising to the overflow section 27, located above the carrier section 25, as shown in FIG. 10. Consequently, the anaerobic microorganisms are effectively prevented from flowing out from the anaerobic reactor 21.

(2) Structure Inhibiting Upward Outflow from the Anaerobic Microorganism-Adhering Carrier Section 25

Third Embodiment

In the apparatus 1 according to the first embodiment, the second supernatant section 26 and the overflow section 27 are provided above the anaerobic microorganism-adhering carrier section 25. However, according to the present invention, the upper structure of the anaerobic reactor is not limited to this aspect. If the aggregate of the anaerobic microorganisms floating up from the suspended sludge section 22, located below the carrier section, excessively adheres excessively to the surfaces of the carriers in the carrier section 25 to reduce the specific gravity of each of the carriers, the carriers may float up.

Thus, in the aeration-less water treatment apparatus according to the present embodiment, a stopper is provide above the carrier section to stop the carriers floating up owing to the reduced specific gravity of each of the carriers. For example, in an aeration-less water treatment apparatus 1B shown in FIG. 11, a wire cloth-like mesh 30 having apertures each smaller than the diameter of the carrier is attached to the top of the anaerobic microorganism-adhering carrier section 25 as a stopper.

According to the apparatus 1B in the present embodiment, as shown in FIG. 12, the mesh 30 prevents the carriers 22b with a reduced specific gravity from floating up unlimitedly without hindering the up flow in the anaerobic reactor 21. The carriers and the anaerobic microorganisms attached to the carriers can be effectively inhibited from flowing out from the overflow section 27 to the anaerobic reactor 10.

Furthermore, in the apparatus 1B according to the present embodiment, even with the anaerobic microorganism-adhering carriers 22b captured by the mesh 30, if the amount of inflow sewage decreases, the quality of the inflow sewage is degraded, or the amount of toxic substance in the inflow sewage decreases to recover the initial condition of the sewage, then advantageously the anaerobic microorganisms peel off the carriers 22b captured by the mesh 30 and settle out downward or the amount of proliferating anaerobic microorganisms decreases. Moreover, if the specific gravity of the anaerobic microorganism-adhering carriers increases back to the initial value, the carriers advantageously settle out downward to recover the initial condition.

(3) Structure Inhibiting Upward Outflow from the Anaerobic Microorganism-Adhering Carrier Section 25

Fourth Embodiment

Moreover, in an apparatus 1C shown in FIG. 13, instead of the mesh 30 in the apparatus 1B, shown in FIG. 11, plural pairs of inclined baffle plates 31 can be arranged parallel to one another above the carrier section 25. The paired inclined baffle plates 31 are inclined to the axis (vertical axis) of the anaerobic reactor 21 and are open downward in the form of the inverted V-like.

The thus arranged plural pairs of inclined baffle plates 31 enable the carriers with a reduced specific gravity to be efficiently captured. Furthermore, the inclination of the baffle plates enhances the agitation between the floating carriers and the anaerobic microorganisms attached to the carriers. As a result, the anaerobic microorganisms peel easily off the carriers. Thus, the temporarily floating carriers and anaerobic microorganisms descend and are placed in the carrier section 25 again.

(4) Formation of Multiple Layers in the Anaerobic Microorganism-Adhering Carrier Section 25

Fifth Embodiment

In the apparatus 1A according to the second embodiment, described above, the anaerobic microorganism-adhering carrier section 25 has a single-layer structure. However, in an apparatus 1D according to the present embodiment shown in FIG. 14, the anaerobic microorganism-adhering carrier section 25 has a multi-layer structure including at least two layers, in this case, anaerobic microorganism-adhering carrier sections 25b and 25c. That is, the apparatus 1D according to the present embodiment has not only the first anaerobic microorganism-adhering carrier section 25b but also the second anaerobic microorganism-adhering carrier section 25c, into which the same filling amount of the same carriers are introduced.

In the apparatus 1D according to the present embodiment, if for example, the aggregate of the anaerobic microorganisms in the suspended sludge section 22, located below the carrier section, has a reduced specific gravity owing to an increase in the amount of inflow sewage, the second carrier section 25c can capture the aggregate (UASB or the like) of the anaerobic microorganisms with the reduced specific gravity which has failed to be captured by the first carrier section 25b. Therefore, if the anaerobic microorganisms float up owing to a change such as an increase in the amount of inflow sewage, the anaerobic microorganisms can be reliably captured by the first and second carrier sections 25b and 25c. The aggregate of the anaerobic microorganisms can thus be inhibited from floating up and flowing out.

(5) Carriers with Difference Grain Sizes in the Anaerobic Microorganism-Adhering Carrier Section 25

Sixth Embodiment

Figure 15:
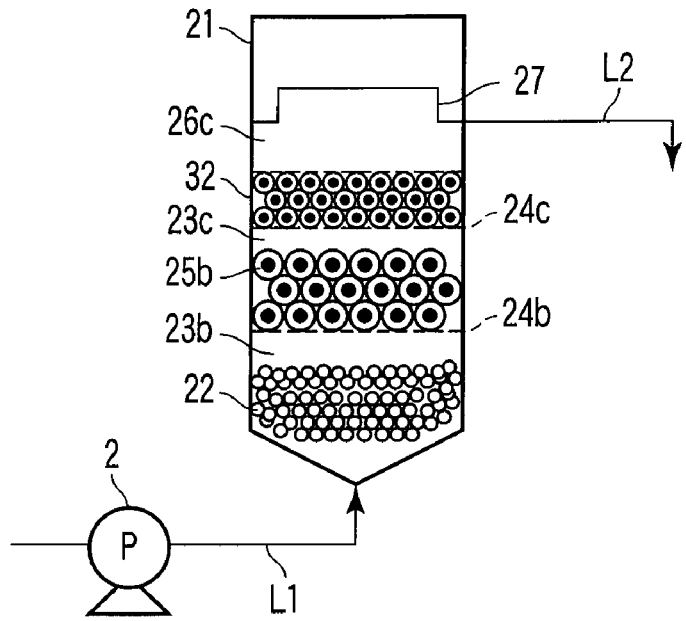
FIG. 15 is a sectional block diagram schematically showing an aeration-less water treatment apparatus according to a sixth embodiment and a seventh embodiment.

In the apparatus 1D according to the fifth embodiment, described above, the carriers of almost the same diameter are used in the plurality of anaerobic microorganism-adhering carrier sections 25b and 25c. In contrast, in an apparatus 1E according to the present embodiment, as shown in FIG. 15, first carriers with almost the same grain size as that of the carriers in the first embodiment are used as the carriers in the first anaerobic microorganism-adhering carrier section 25b in a lower stage. However, second carriers with a smaller grain size than the first carriers are used as carriers in a second anaerobic microorganism-adhering carrier section 32 in an upper stage.

Figure 16:
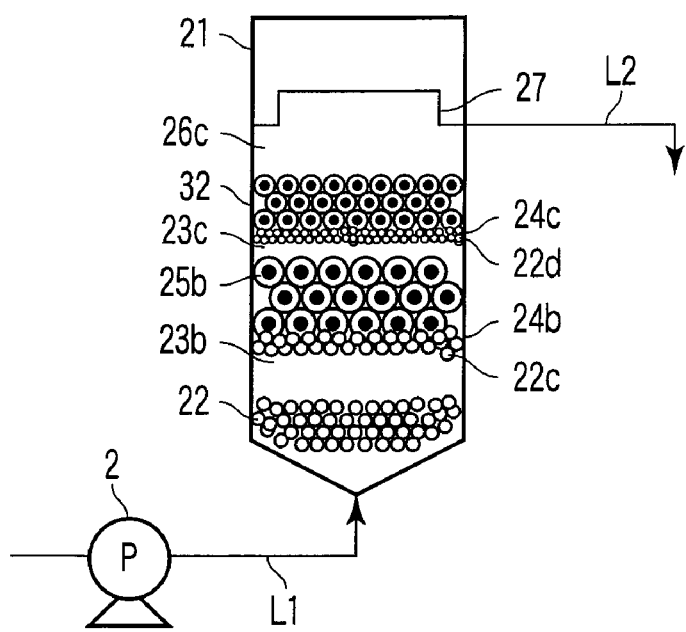
FIG. 16 is a sectional block diagram illustrating the operation of the apparatus according to the sixth and seventh embodiments shown in FIG. 15.

Anaerobic microorganisms 22c and 22d with different grain sizes may float up owing to a decrease in the size of the anaerobic microorganisms in the suspended sludge section 22 or a decrease in the specific gravity of some of the anaerobic microorganisms resulting in a variation in specific gravity. In this case, the anaerobic microorganisms 22d, having a smaller grain size, may fail to be captured by the carrier section and flow out upward. However, in the apparatus 1E according to the present embodiment, as shown in FIG. 16, the carriers with the smaller grain size are arranged in the second anaerobic microorganism-adhering carrier section 32 in the upper stage. The smaller grain size of the carriers increase and thus an increased surface area and can thus capture even the smaller floating anaerobic microorganisms 22d.

Thus, even if a variation in the amount of inflow sewage reduces and varies the specific gravity of the anaerobic microorganisms, the anaerobic microorganisms contact the carrier sections 32 and can thus be effectively inhibited from floating up and flowing out.

(6) Carriers with Different Surface Areas in the Anaerobic Microorganism-Adhering Carrier Section 25

Seventh Embodiment

An aeration-less water treatment apparatus according to the present embodiment has a vertical two-stage structure in which a second carrier section is located above a first carrier section as in the case of the apparatus 1E in FIG. 15, through the structure is not specifically shown in the drawings. In the present embodiment, the carriers in the second carrier section have a surface area different from that of the carriers in the first carrier section. For example, even with the same shape (for example, a cylindrical shape) and the same grain size, the first carriers may be made up of vinyl chloride, and the second carriers may be made up of polypropylene (PP).

According to the present embodiment, the carriers have the similar shapes and grain sizes to stabilize the performance of the normal water treatment operation in removal of the organic polluted matter. Furthermore, since the carriers have the different surface areas, as described above, even if for example, the amount of inflow water increases, the second anaerobic microorganism-adhering carrier section, located above the first anaerobic microorganism-adhering carrier section, can efficiently capture the floating anaerobic microorganisms.

(7) Carries with Different Shapes in the Anaerobic Microorganism-Adhering Carrier Section 25

Eighth Embodiment

Figure 17:
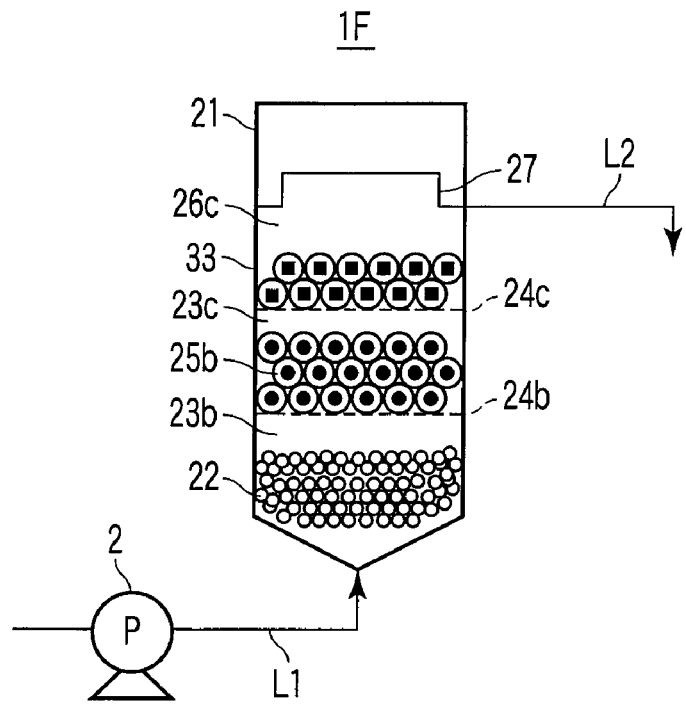
FIG. 17 is a sectional block diagram schematically showing an aeration-less water treatment apparatus according to an eighth embodiment.

In an aeration-less water treatment apparatus 1F according to the present embodiment, as shown in FIG. 17, the first anaerobic microorganism-adhering carrier section 25b is located in the lower stage of the anaerobic reactor 21. The second anaerobic microorganism-adhering carrier section 33 is located in the upper stage of the anaerobic reactor 21. That is, the carriers in the first carrier section 25b are spherical, whereas the carriers in the second carrier section 33 are cubic. This combination, even microorganisms that cannot be easily captured by the spherical first carriers can be captured by the cubic second carriers because the latter have four corners. Thus, even the anaerobic microorganisms with a lower specific gravity, which are likely to float up, can be captured by the second carrier section 33. Therefore, the anaerobic microorganisms can be inhibited from flowing out toward the aerobic reactor 10.

Furthermore, the shapes of the first and second carriers with the different shapes are not limited to the combination of the sphere and the cubic. Although not shown in the drawings, for example, a combination of carriers with different shapes described below can be used.

1) First carriers: sphere+Second carriers: cylinder
2) First carriers: sphere+Second carriers: string-like shape
3) First carriers: cylinder+Second carriers: string-like shape That is, the second carries have a more uniform shape than the first carriers to allow the anaerobic microorganisms to be efficiently captured in the anaerobic reactor. Thus, the anaerobic microorganisms can be effectively inhibited from flowing out toward the aerobic reactor.

As in the case of the combinations of the carriers with the different shapes in 2) and 3), described above, the string-like shape is desirably used for the second carriers in connection with prevention of possible outflow of the anaerobic microorganisms and the easiness of maintenance.

(8) Return Line for the Floating Anaerobic Microorganisms

Ninth Embodiment

Figure 18:
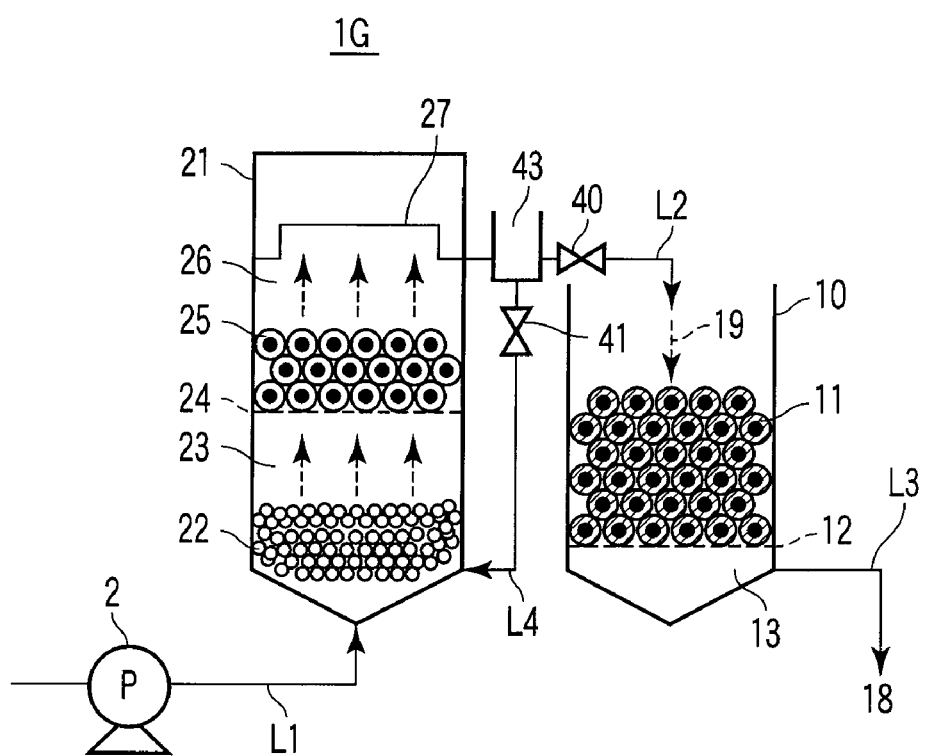
FIG. 18 is a sectional block diagram schematically showing an aeration-less water treatment apparatus according to a ninth embodiment.

As shown in FIG. 18, an aeration-less water treatment apparatus 1G according to the present embodiment has a first valve 40 in the overflow line L2, communicating with the overflow section 27, and a second valve 41 in a return line L4 branching from the overflow line L2. A drain pot 43 is mounted in an area where the return line L4 branches from the overflow line L2. The drain pot 43 has a function of allowing waste water having overflowed from the anaerobic reactor 21 to be temporarily collected in the drain pot 43, where the anaerobic microorganisms are precipitated.

In the apparatus 1G according to the present embodiment, during a steady state operation, the first valve 40 is open, and the second valve 41 is closed. Thus, anaerobic treatment water is fed from the anaerobic reactor 21 to the top of the aerobic reactor 10 via the overflow line L2. Here, if the anaerobic microorganisms in the suspended sludge section 22 or anaerobic microorganism-adhering carrier section 25 in the anaerobic reactor 21 have a reduced specific gravity or are dispersed to float up as a result of an increase in the amount of inflow sewage or the like, the valve 40 is closed, whereas the valve 41 is open. That is, closing the first valve 40 and opening the second valve 41 allows the anaerobic microorganisms having floated up to the overflow line L2 to be returned to the bottom of the anaerobic reactor 21 through the return line L4 for recycling. This not only increases the yield of the anaerobic microorganisms but also prevent the possible mixture of the anaerobic microorganisms, which may reduce the efficiency of an aerobic treatment in down steps.

According to the present embodiment, the anaerobic microorganisms with a smaller grain size or the like, which difficult to capture only by the anaerobic microorganism-adhering carrier section 25, are returned to the anaerobic reactor 21. This enables inhibition of a decrease in the concentration of the anaerobic microorganisms in the anaerobic reactor 21.

The present embodiment is not limited to the apparatus 1G, shown in FIG. 18. Other modifications and variations are possible as described below.

In the apparatus 1G in FIG. 18, the return line L4 branches from the overflow line L2 between the anaerobic reactor 21 and the aerobic reactor 10. However, the return line L4 may be provided outside and below the overflow section 27 and in the middle of the second supernatant section 26 or anaerobic microorganism-adhering carrier section 25 in the anaerobic reactor 21 (a change of an inlet of the return line L4).

Furthermore, in the water treatment apparatus 1G in FIG. 18, the return line L4 is connected to the bottom of the anaerobic reactor 21. However, the return line L4 may be connected to the waste water pump 2 so as to precede the waste water pump 2 (a change of an outlet of the return line L4). In this case, not only the first valve 40 and the second valve 41 can be opened and closed but also the pump 2 can be driven to cyclically return the anaerobic microorganisms to the anaerobic reactor 21. This prevents a possible decrease in the concentration (abundance) of the anaerobic microorganisms in the anaerobic reactor 21.

(9) Flow Reversing Line for the Floating Anaerobic Microorganisms

Tenth Embodiment

As shown in FIG. 19, a water treatment apparatus 1H according to the present embodiment comprises a return line L5 branching from the overflow line L2, a set of valves 49 and 50 attached to the overflow line L2 so as to sandwich a branching point between the lines L2 and L5, between the valves 49 and 50, a valve 51 attached to the return line L5, a valve 53 attached to the supply line L1 from the pump 2, a bypass line L6 connecting the bottom of the anaerobic reactor 21 to a part of the supply line L1 located upstream of the pump 2, a valve 54 attached to the bypass line L6, a controller 55 that controls operations of opening and closing the valves 49, 50, 51, 53, and 54, and a sensor 56 that senses the condition of the carriers (for example, the position of the carriers or the condition in which the microorganisms adhere to the carrier).

According to the apparatus 1H in the present embodiment, during a normal operation, the valves 51, 53, and 54 are closed, while the valves 49 and 50 are open, to feed all of the treatment water in the anaerobic reactor 21 to the aerobic reactor 10. However, if the anaerobic microorganisms in the suspended sludge section 22 float and flow out, the valves 53 and 54 are opened, while the valves 49 and 50 are closed, to perform an operation of allowing the sewage to flow in a direction opposite to that in the normal operation. That is, upon receiving a sense signal from the sensor 56, the controller 55 controls the driving of the pump 2 and the operations of opening and closing the valves 49, 50, 51, 53, and 54. Specifically, the controller 55 closes the valve 50, while opening the valves 51, 53, and 54, to perform the operation of allowing the waste water to flow in the reverse direction from above to below. The flow reversing operation is thus performed to force the anaerobic microorganisms having flowed out to the upper part of the anaerobic reactor 21 to flow through the anaerobic reactor 21 as a down flow. The anaerobic microorganisms are thus returned into the anaerobic microorganism-adhering carriers 25 and/or the suspended sludge section 22. After the anaerobic microorganisms are thus returned into the anaerobic reactor 21, the valves 49, 50, 51, 53, and 54 are returned to the initial conditions. Then, the normal operation is resumed.

As a result, the flow reversing operation can return a small amount of outflow anaerobic microorganisms that have failed to be captured, to the initial predetermined position. Thus, the concentration of the anaerobic microorganisms in the anaerobic reactor 21 can be maintained at an appropriate value.

(10) Suspended Sludge Section Based on Digestive Sludge

Eleventh Embodiment

In the apparatus 1 according to the first embodiment, UASB (having a grain size of 1 to 5 mm), an aggregate of anaerobic microorganisms, is fed into the suspended sludge section 22. However, in the present invention, the anaerobic microorganisms in the suspended sludge section 22 are not limited to UASB.

In an aeration-less water treatment apparatus 1J according to the present embodiment, as shown in FIG. 20, digestive sludge, having a small grain size of 0.01 to 1 mm, is fed into the suspended sludge section. Thus, the present embodiment uses a suspended sludge section 60 based on the digestive sludge. Such digestive sludge is obtained in down steps of the aerobic treatment as described in JPA KOKAI Publication No. 11-285696, described above. The digestive sludge thus requires lower costs than UASB, enabling inexpensive operations. Furthermore, the digestive sludge has a smaller grain size than UASB and is thus disadvantageously likely to flow out as a result of a variation such as an increase in the flow rate of sewage. However, the apparatus 1H according to the present embodiment has the anaerobic microorganism-adhering carrier section 25 in the upper part. Thus, the anaerobic microorganisms adhering to the carriers in the anaerobic microorganism-adhering carrier section 25 adhere to the anaerobic microorganisms in the digestive sludge, which are thus easily captured in the carrier section 25.

Furthermore, it is possible to use not only UASB and the digestive sludge but also anaerobic sludge or oxygen-free sludge for the anaerobic/aerobic activated sludge method, cyclic denitrification method, or anaerobic-oxygen-free-aerobic method (A20 method: Advanced Treatment Facility Design Manual (proposal) issued by JAPAN SEWAGE WORKS ASSOCIATION on May 25, 1994) which contain facultative anaerobic bacteria. In this case, even if the inflow water contains DO (Dissolved Oxygen), the facultative anaerobic bacteria, also contained in the sludge, stabilize the quality of the treatment water without degrading the activity of removing the organic polluted matter.

(11) Anaerobic Microorganism-Adhering Carriers Based on the Digestive Sludge

Twelfth Embodiment

In the apparatus 1 according to the first embodiment, the anaerobic microorganisms in UASB, the aggregate of the anaerobic microorganisms, are attached to the carriers in the anaerobic microorganism-adhering carrier section 25. However, the anaerobic microorganisms in the carrier section 25 are not limited to UASB.

Figure 21:
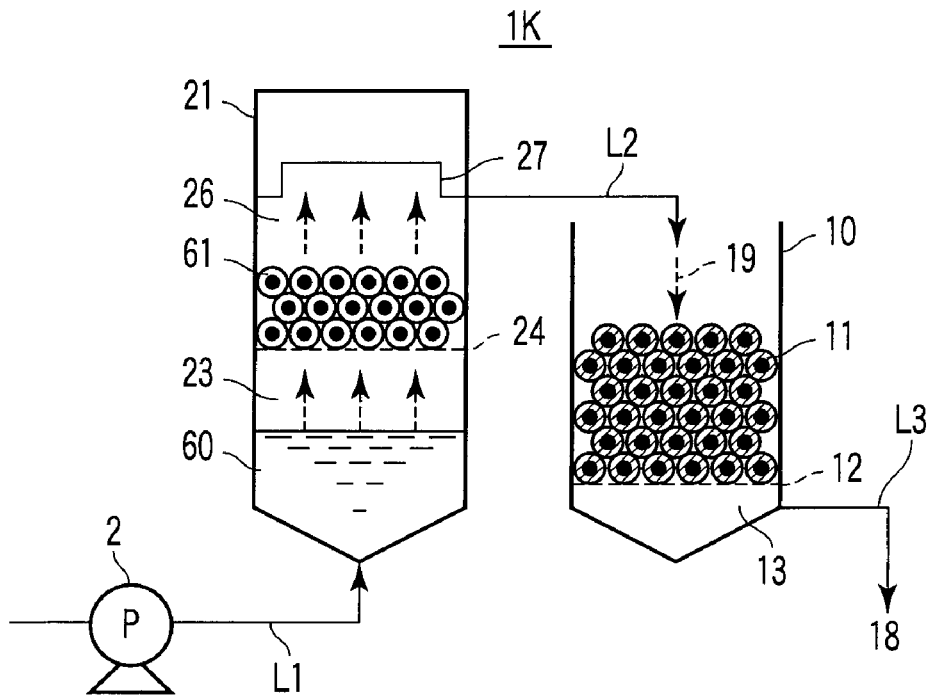
FIG. 21 is a sectional block diagram schematically showing an aeration-less water treatment apparatus according to a twelfth embodiment.

As shown in FIG. 21, the apparatus 1K according to the present embodiment, like the apparatus 1J in FIG. 20, described above, uses an anaerobic microorganism-adhering carrier section 61 based on the digestive sludge and into which the digestive sludge is fed instead of UASB as the anaerobic microorganisms attached to the carriers. Also in this case, as described above, the digestive sludge is more inexpensive than UASB, enabling operations at low costs.

In another embodiment, anaerobic sludge for the anaerobic/aerobic activated sludge method or the like can be used instead of the digestive sludge. The present embodiment exerts an effect such that the anaerobic sludge enables more inexpensive operations than the digestive sludge.

The apparatus according to the present invention uses the pump to feed sewage to the anaerobic fixed bed reactor, and raises the sewage through the reactor as an up flow so that the organisms in the sewage are roughly primarily treated by the anaerobic microorganisms present in the reactor. The apparatus then introduces sewage discharged from the anaerobic fixed bed reactor into the aerobic fixed bed reactor, and lowers the discharged water through the aerobic fixed bed reactor as a down flow so that the organisms remaining in the discharged water are purified by the aerobic microorganisms present in the reactor.

(12) Supply of a Small Amount of Air

Thirteenth Embodiment

Figure 22:
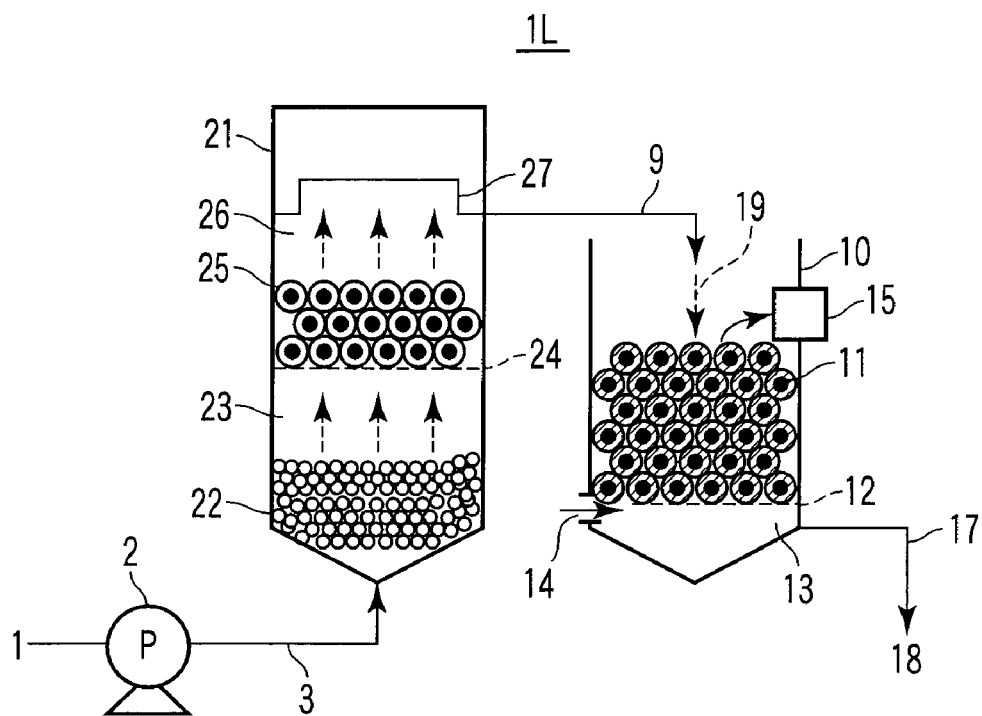
FIG. 22 is a sectional block diagram schematically showing an aeration-less water treatment apparatus according to a thirteenth embodiment.

In the apparatus 1 according to the first embodiment, the aerobic reactor 10 uses atmospheric-pressure air supplied by the upper open system. However, as shown in FIG. 22, an apparatus 1L according to the present embodiment has a vent hole 14 and a fan 15 arranged as ventilation means to allow a small amount of air to be supplied. A plurality of vent holes and fans may be provided.

In this case, the fan 15 is actuated to generate the flow of air traveling from the vent hole 14 to the fan 15 via the aerobic microorganism-adhering carrier section 11. The air flow allows the aerobic microorganisms in the aerobic microorganism-adhering carrier section 11 to contact air to achieve the aerobic treatment while increasing the amount of oxygen required for the aerobic treatment as shown in Formulae (4) and (5).

The present embodiment exerts an effect such that even if a required amount of air for the aerobic microorganism-adhering carrier section 11, shown in Formulae (4) and (5), is not obtained, the air supply through the fan allows the required amount of air to be supplied. Therefore, the treatment efficiency of the aerobic reactor 10 can be stably maintained.

The various embodiments have been described. However, the present invention is not limited to the above-described embodiments, but the embodiments can be varied or combined together.

According to the present invention, if the amount of inflow sewage increases, the quality of inflow sewage is degraded, a toxic substance or the like mixes into the inflow sewage, the amount of fermentation gas in the anaerobic reactor increases, or the quality of the inflow sewage is changed from high-concentration BOD industrial liquid waste to low-concentration BOD sewage, the anaerobic microorganisms can be inhibited from flowing out, thus stabilizing the treatment performance of the anaerobic and aerobic reactors. As a result, treated water with stable quality can be discharged.

What is claimed is:

1. An aeration-less water treatment apparatus comprising:
an anaerobic treatment tank which receives sewage fed by a pump through a bottom of the tank to cause the sewage to flow as an upward stream so that the sewage contacts anaerobic microorganisms to anaerobically treat polluted matter in the sewage;
an aerobic treatment tank which receives treated water from the anaerobic treatment tank at a top of the aerobic treatment tank to cause the treated water to flow as a downward stream and supplies the treated water to atmospheric pressure air by means of free fall so that the treated water contacts aerobic microorganisms and air to aerobically treat the polluted matter in the treated water;
a suspended sludge section located in a lower part of the anaerobic treatment tank, having an initial amount of anaerobic microorganisms that become suspended in the sewage, the suspended sludge section being configured to perform a primary biological treatment of the sewage; and
a carrier section located in an upper part of the anaerobic treatment tank, having carriers, supported by a carrier support section, to which the anaerobic microorganisms are attached, the carrier section being configured to perform a secondary treatment of the sewage,
the anaerobic microorganisms having flowed from the suspended sludge section being further attached to the carriers which prevent the anaerobic microorganisms from flowing out from the anaerobic treatment tank into the aerobic treatment tank.

2. The apparatus according to claim 1, wherein the carrier section has string-like carriers hung from and supported by the carrier section.

3. The apparatus according to claim 2, wherein the string-like carrier has a stem string and a plurality of branch strings attached around a periphery of the stem string.

4. The apparatus according to claim 1, wherein the suspended sludge section has granule or digestive sludge.

5. The apparatus according to claim 1, further comprising at least one of a mesh, a strainer, a baffle plate, and a filter device above the carrier section.

6. The apparatus according to claim 1, wherein the carrier section has a plurality of carrier groups arranged in sequence in a height direction of the anaerobic treatment tank.

7. The apparatus according to claim 1, wherein first carriers with a large grain size are located in a lower part of the carrier section, and second carriers having a smaller grain size than the first carriers are located in an upper part of the carrier section.

8. The apparatus according to claim 7, wherein the first carriers of a material having a small surface area are located in the lower part of the carrier section, and the second carriers of a material having a larger surface area than the first carrier are located in the upper part of the carrier section.

9. The apparatus according to claim 1, wherein carriers shaped like masses having a high shape uniformity are located in the lower part of the carrier section, and carriers shaped like strings having a lower form uniformity than the mass-like carriers are located in the upper part of the carrier section.

10. The apparatus according to claim 1, further comprising returning means for returning the anaerobic microorganisms from at least one of the carrier section, the upper part of the carrier section, and an outlet of the anaerobic treatment tank to the suspended sludge section.

11. The apparatus according to claim 1, further comprising flow reversing means for reversing a water stream in the anaerobic microorganisms from the upward stream to the downward stream.

12. The apparatus according to claim 1, wherein at least one of an up flow anaerobic sludge blanket, digestive sludge, and anaerobic microorganisms in anaerobic sludge for a biological nitrogen or phosphorous removal method is present in the suspended sludge section of the anaerobic treatment tank.

13. The apparatus according to claim 1, wherein at least one of an up flow anaerobic sludge blanket, digestive sludge, and anaerobic microorganisms in anaerobic sludge for a biological nitrogen or phosphorous removal method is present in the carrier section.

14. The apparatus according to claim 1, further comprising string-like carriers arranged in the aerobic treatment tank and to which aerobic microorganisms are attached.

15. The apparatus according to claim 1, further comprising ventilation means on a side surface of the aerobic treatment tank.

16. The apparatus according to claim 1, wherein
a distance L1 between string-like carriers is −1 to +4 times as large as an outer peripheral diameter of the string-like carrier, when a condition in which adjacent ones of the string-like carriers overlap is expressed by a minus scale of the distance L1.

17. The apparatus according to claim 1, wherein
a filling factor of the carrier section is within the range of 10 to 50%.

* * * * *